Figure 1:
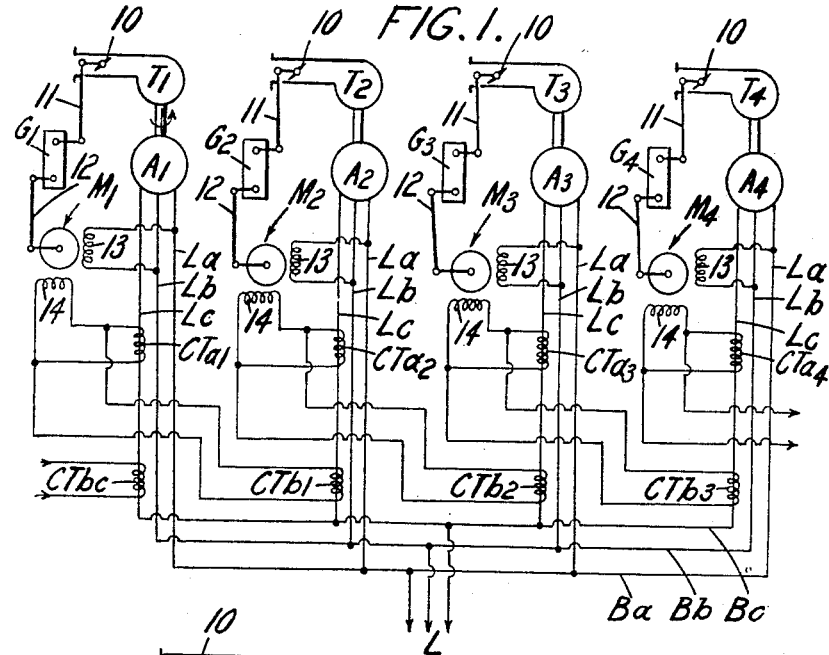

May 7, 1957  J. A. CHILMAN ET AL  2,791,700

POLYPHASE ALTERNATING CURRENT SYSTEM

Filed Oct. 10, 1955  3 Sheets-Sheet 1

INVENTORS
J. A. CHILMAN,
A. G. MAPP +
J. CRIPPS

By Wilkinson & Mawhinney
ATTYS.

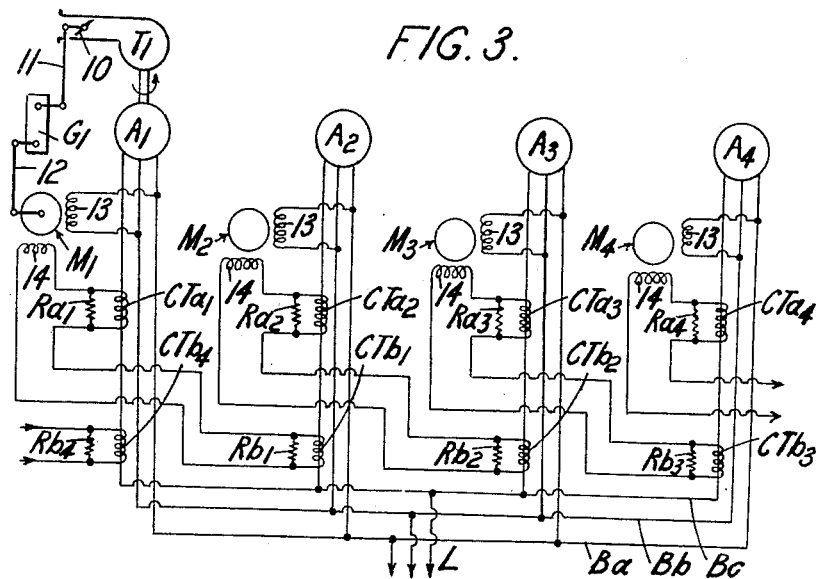
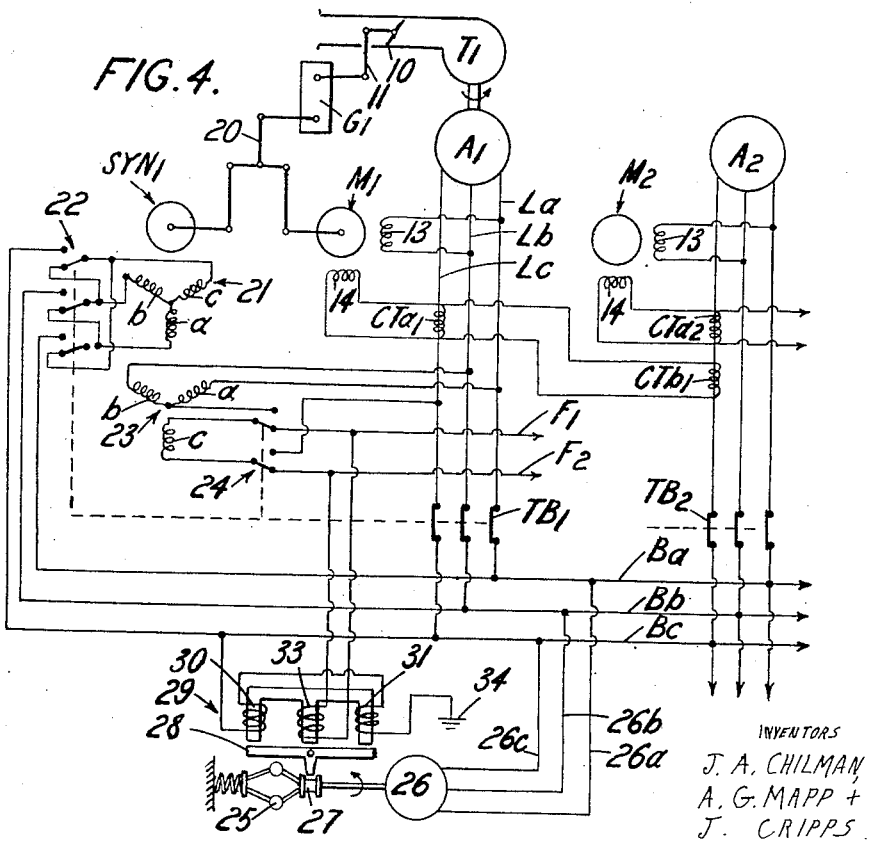

United States Patent Office 2,791,700
Patented May 7, 1957

2,791,700
POLYPHASE ALTERNATING CURRENT SYSTEM

John Alfred Chilman, Alfred George Mapp, and John Cripps, Gloucester, England, assignors to Rotol Limited, Gloucester, England, a British company Application October 10, 1955, Serial No. 539,581

Claims priority, application Great Britain October 12, 1954

11 Claims. (Cl. 307—57)

This invention relates to polyphase alternating current systems comprising a plurality of alternators driven by separate prime mover and arranged for connection in parallel to a common utilisation network, and concerns, more particularly, the means provided in such a system for ensuring that the load is divided in a desired manner between the alternators.

In a system of this kind described in the specification accompanying the co-pending application United States Serial No. 539,584, filed October 10, 1955, the prime mover of each alternator is provided with power-control means and operating means therefor responsive to the ratio of the electrical load on the said alternator to the electrical load on all the alternators, or on all the other alternators.

As the number of alternators in the system is increased such a system involves increasing complication in the provisions necessary for readjusting the system as alternators are paralleled or isolated from the network, and the primary object of the present invention is to provide an improved arrangement which does not have this disadvantage.

According to the invention, in a polyphase alternating current system comprising a plurality of alternators driven by separate prime movers and arranged for connection in parallel to a common utilisation network, the prime mover of each alternator is provided with power-control means and operating means therefor responsive to the ratio of the electrical load on the said alternator to the electrical load on another of the alternators, the system being arranged in the manner of a closed chain so that, when all the alternators are connected in parallel to the network, the load on a first alternator is controlled to maintain said load in a desired ratio with the load on a second alternator the load on the second alternator is controlled to maintain said load in a desired ratio with the load on a next alternator, and so on, the load on the last alternator in the system so controlled being controlled to maintain said load in a desired ratio with the load on the first alternator.

In a preferred arrangement according to the invention the operating means for each power-control means comprises a two-phase induction motor one phase-winding of which is energised in proportion to the line voltage and the other phase-winding of which is connected across the secondary of a current transformer in one of the phase lines of the output of the associated alternator, and, in opposition to the energisation thereby produced, across the secondary of a current transformer in the corresponding phase line of the output of the next alternator in the chain. Preferably the two current transformer secondaries are in parallel with one another and with the said phase winding to which they are connected.

When one alternator of the system is isolated from the network, the closed chain system becomes an open chain system and the load-sharing process will continue to function in such a condition, but should another alternator be isolated, not being an "end" alternator of the open chain, the load-sharing process will become incomplete. For this reason, and also because a closed chain will always work more efficiently than an open one, it is preferred to "repair the chain" whenever an alternator is isolated from the system.

It is preferred (and in some cases essential) to employ two current transformers in corresponding phase lines of all the alternators, the two secondaries thereof forming respectively part of the load control system of the alternator the phase line of which they are in and part of the load control system of the alternator preceding in the chain the alternator the phase line of which they are in.

A preferred arrangement permitting "repair" as aforesaid consists in the provision of means for connecting said other phase winding of the two-phase induction motor also in parallel with the secondaries of the current transformers forming part of the load control system of the next alternator in the chain when said next alternator is isolated from the network.

If the load circuit of an isolated alternator is to be maintained the two current transformers in a phase line of that alternator have substantially equal transformation ratios and their secondaries are in opposition.

In another arrangement according to the invention the other phase winding of the two-phase induction motor is connected in series with two resistances across one of which a potential drop is produced in one sense proportional to the current in one of the phase lines of the output of the associated alternator and across the other of which a potential drop is produced in the opposite sense proportional to the current in the corresponding phase line of the output of the next alternator in the chain. Preferably the said potential drops are produced by currents derived through current transformers from the respective phase lines.

In the "closed chain" system of load-sharing forming the principal subject of the present invention the load-sharing correction is applied to all the alternators of the system so that, even where the power control is effected through variable-datum governors, there is no absolute frequency reference since all the datums are being continuously adjusted.

To overcome this objection there is provided in the system, according to a feature of the invention, a frequency-responsive device and means for controlling thereby the power supplied by at least one of the prime movers to its associated alternator to maintain the frequency within a desired range.

Preferably, according to a further feature of the invention, the frequency-responsive device is operated by power taken from the network and is adapted to produce an error signal when the frequency of the network departs from a desired range, means being provided for adjusting, in accordance with the said signal, the power-control means for each prime mover driving an alternator paralleled to the network.

In such a system it is further preferred, according to the invention, to operate power control means for each prime mover in response to load-share correction signals through a variable-datum governor having a drooping load-speed characteristic, and also to operate the same or different power control means for each prime mover by a substantially isochronous frequency governing system. Such an arrangement greatly assists stability in the load-sharing process while permitting the output frequency of the whole system to be maintained within close limits.

Before an alternator can be paralleled to an energised network it is of course necessary to synchronise the frequency of that incoming alternator to that of the network, and for this purpose a dynamo-electric actuator can be used to adjust the power-control means of the prime mover in response to differences of frequency between the alternator and the network. When paralleling has been effected the actuator becomes inoperative and actuation of the power-control means is taken over by the load-sharing system.

According to a feature of the present invention, in such a system wherein there is associated with an alternator, its prime mover and power control means therefor a dynamo-electric actuator for adjusting the power control means in response to differences of frequency between the alternator and the network during speed adjustment of the alternator for paralleling, there is provided switch means for changing over the actuator when the alternator has been paralleled to operate the power control means in response to change of frequency of the network relatively to a datum.

In an alternative arrangement according to another feature of the invention there is provided switch means for changing over the dynamoelectric synchronising actuator, when the associated alternator has been paralleled, to operate the power control means in response to changes in the ratio of the load on the associated alternator to the load on one or more of the other alternators, e. g. to constitute the aforesaid two-phase motor associated with that alternator.

Embodiments of the invention having these and other features of the invention will now be described by way of example with reference to the accompanying drawings. In the drawings:

Figure 1 shows a circuit for carrying out the "closed chain" system of load sharing.

Figure 2:
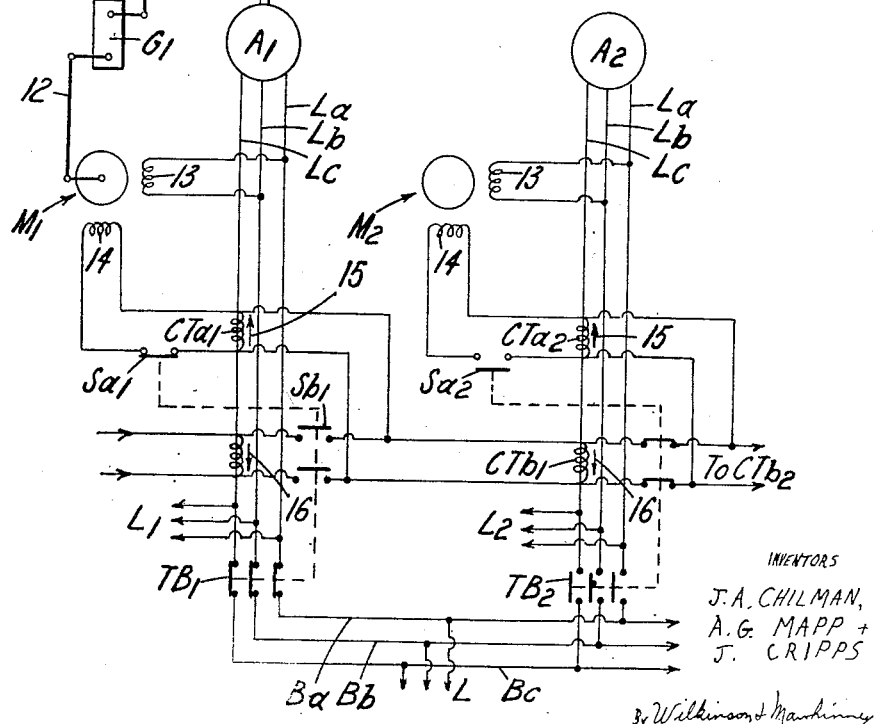
Figure 5:
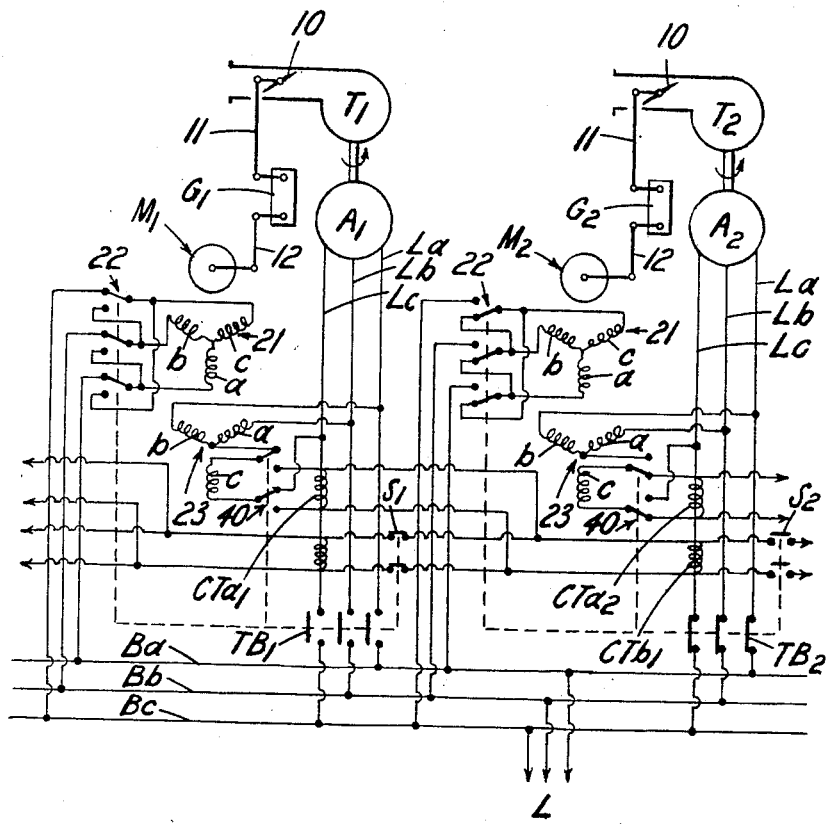

Figure 2 shows a circuit for switching to "repair the chain" when an alternator is isolated from the network, Figure 3 shows an alternative circuit for carrying out the "closed chain" system of load sharing, Figure 4 shows a circuit for operating a frequency reference device, and also the use of the synchronising actuator for frequency correction after paralleling, Figure 5 shows a circuit using the synchronising actuator for load share control after paralleling.

In the system shown in Figure 1 four three-phase alternators A1, A2, A3, and A4, are driven by separate air turbines T1, T2, T3, and T4. All the alternators are connected in parallel by tie bars Ba, Bb, and Bc which connect their output lines La, Lb and Lc, and one or more loads L are connected to the tie bars. Each air turbine is provided with a power control throttle 10 conected by linkage 11 with a variable datum governor G1, G2, G3, and G4 respectively, the datum controls of the governors being connected by further linkage 12 to two-phase load-share corrector motors M1, M2, M3, and M4 respectively. One phase-winding 13 of each motor is connected between the output lines La and Lb of its associated alternator so as to be energised in proportion to the supply voltage between these lines, and the other phase winding 14 is connected across the secondary of a current transformer $CTa_1$, $CTa_2$, $CTa_3$, and $CTa_4$, respectively, in the third phase line Lc of its associated alternator. In opposition to the energisation of the windings 14 produced by the above-mentioned current transformers, each winding 14 is also connected across the secondary of a current transformer $CTb_1$, $CTb_2$, $CTb_3$ and $CTb_4$ respectively in the phase line Lc of the next alternator. Each winding 14 is thus traversed by a current which is the difference between the currents induced in the secondaries of the current transformers connected in parallel with it, so that by suitable choice of the transformer ratios the current through the winding 14 becomes zero at a desired ratio between the currents in the lines Lc of adjacent alternators. Since the energisation of the motor windings 13 is in quadrature with the line currents it follows that the torque on each motor M is proportional to the amount by which the ratio of the actual loads on the adjacent alternators differs from the pre-arranged ratio, and the torque may be employed to adjust the datum of the associated governor M so that the power of the turbine is adjusted to restore the ratio of the loads to the desired value. It will be seen that the system is symmetrical for all the alternators, however many there may be in the system, and is in the nature of a closed chain, the load on the first alternator being controlled in a desired ratio with that on the second, and so on, until the load on the last alternator is controlled in a desired ratio with that on the first.

If in such a system one alternator is isolated from the tie bars the load share corrector motor M of the alternator preceding it in the chain is put out of operation, but the load sharing process will continue to operate, though somewhat less efficiently, the loads on all the other paralleled alternators being adjusted with reference to the uncontrolled alternator as a master. The isolating of a further alternator, not being an end alternator of the chain, will however break the chain to form two systems without load share correction between them. It is preferable therefore for both reasons to make provision for automatically closing the chain whenever an alternator is isolated from the tie bars.

In a system in which all the alternators are of equal capacity, so that all the current transformers of the load-sharing system have the same ratio, such repairing of the chain can be effected very simply by a switching system as shown in Figure 2.

This figure shows only two of the alternators A1 and A2 and one of the driving turbines T1 but it will be understood that it can be extended for any number of alternators. In addition to the winding 14 of the motor M1 (for example) being connected across the secondaries of the current transformers $CTa_1$ and $CTb_1$ of the load control system of its own alternator it is also connected, by the closing of a switch $Sb_2$, across the secondaries of the current transformers $CTa_2$ and $CTb_2$ of the load control system of the next alternator A2 when the said alternator A2 is isolated from the network by the opening of a tie-breaker switch TB2 connecting the output lines L of the alternator A2 to the tie bars B. At the same time a switch $Sa_2$ disconnects the winding 14 of the motor M2 from the transforcer $CTa_2$. If, at any instant, the current flowing in the secondaries of the transformers CTa (suffix 1, 2 etc.) is represented by the upwardly directed arrows 15, that flowing in the secondaries of the transformers CTb (suffix 1, 2 etc.), will be in the opposite direction as represented by the arrows 16. Thus, although when the switch $Sb_2$ is closed the transformers $CTa_2$ and $CTb_1$ are connected in parallel with the winding 14 of the motor M1, the currents induced in them, if the alternator A2 continues to be run as a separate unit to supply a load L2, are equal and opposite and have no effect upon the energisation of the winding 14 of the motor M1, this being dependent only on the difference between the currents induced in the transformers $CTa_1$ and $CTb_2$ so that the load on the alternator A1 is now controlled in relation to the load on the alternator A3 instead of in relation to the load on the alternator A2.

Whereas in Figure 1 the windings 14 of the load share corrector motors M are connected in parallel with the secondaries of the current transformers of the load control system, this being the preferred method since the secondaries are then virtually short-circuited, which condition is necessary to ensure phase agreement and correct transformation ratio between the primary and secondary currents, it is also possible to operate satisfactorily with an arrangement as shown in Figure 3 in which the current transformers produce potential drops across resistances Ra (suffix 1, 2 etc.) and Rb (suffix 1, 2 etc.) connected in series with the windings 14. In this case of course the potentials across the resistances Ra have to be in opposition to the potentials across the resistances Rb.

Since in a system such as that of any of the figures already described, in which the power of all the prime movers is subject to continual adjustment for load-sharing purposes, there is no fixed speed reference, the frequency of the system is liable to vary between unacceptably wide limits. To correct this tendency at least one of the prime mover-alternator units should be governed with reference to its frequency, but if only one unit is so controlled, difficulties occur if provision must be made for isolating this unit from the network. For this reason it is preferred to provide a frequency reference device operated by power taken from the tie bars of the system and providing an error signal which can be used to control any or all the prime mover-alternator units. Such a system is illustrated in Figure 4, the control system for only one alternator unit $A_1$ being shown completely. The figure also shows how a dynamo-electric machine used for synchronising the alternator with the network before paralleling can be used to effect such frequency correction after paralleling.

In this arrangement the throttle 10 of the turbine $T_1$ of the alternator $A_1$ (taken by way of example) is operated by a governor $G_1$ the datum of which is controlled through a differential device 20 either by a load-share corrector motor $M_1$, arranged in the manner already described in connection with Figure 1, or by a synchronising actuator $SYN_1$. The synchronising actuator is a dynamo-electric machine of the kind described in British patent specification No. 516,613, filed May 11, 1938, accepted January 5, 1940, and sealed and granted March 28, 1940, and comprises a short-circuited wound rotor and two three-phase stator windings. For synchronising purposes one of the stator windings, 21, comprising the phase windings $a$, $b$ and $c$ is connected through a switch 22 to the tie bars $Ba$, $Bb$ and $Bc$. When synchronising has been completed and the tie-breaker switch $TB_1$ closed to parallel the alternator $A_1$ the switch 22 is changed over simultaneously to the position shown in the figure to short-circuit the winding 21. The other stator winding 23 is, for synchronising, similarly connected through a switch 24 to the output lines $La$, $Lb$ and $Lc$ of the alternator $A_1$. The two stator windings are arranged to produce fields rotating in opposite directions and the rotor turns at a speed equal to the difference between the field speeds, the turning of the rotor being applied through the governor $G_1$ to adjust the power transmitted to the alternator in the sense to eliminate the difference of frequency between the alternator output lines $La$, $Lb$ and $Lc$ and the tie bars $Ba$, $Bb$ and $Bc$. When synchronism has been reached to sufficient accuracy the tie-breaker switch $TB_1$ may be closed at a moment of phase agreement, for example as described in the specification accompanying application United States Serial No. 539,583, filed October 10, 1955, the switch 22 also being changed over to short circuit the winding 21 as already described. Closing of the tie-breaker switch is also arranged to change-over the switch 24 to the position shown in the drawing, which has the effect of separating the phase $c$ of the winding 23 from the phases $a$ and $b$ and connecting it to frequency error signal lines $F_1$ and $F_2$. The actuator $SYN_1$ is thus converted to a two phase motor, one phase winding of which, comprising the windings $23a$ and $23b$, is connected across the output lines $La$ and $Lb$ of the alternator $A_1$, and the other phase winding of which, comprising the winding $23c$, is energized by the frequency error signal. Consequently the power output of the turbine $T_1$ is now controlled by the actuator $SYN_1$ in the sense to reduce the frequency error signal to zero.

In the arrangement shown in Figure 4, the frequency error signal is produced by a centrifugal governor 25 driven by a synchronous motor 26 operated from the tie bars through phase lines $26a$, $26b$ and $26c$. The output member 27 of the governor is coupled to the control member 28 of a differential transformed 29 comprising opposed primary windings 30 and 31 energised by the phase voltage between the line $26c$ and the neutral point 34, the transformer also comprising a secondary winding 33 connected to the frequency error signal lines $F_1$ and $F_2$. In the "on frequency" condition the control member 28 is symmetrically arranged with respect to the iron circuits through the two primary windings and the secondary winding so that the actuator $SYN_1$ acting as a two-phase motor is not actuated. When a frequency error occurs the magnetic circuits become unbalanced thus causing an error signal to be induced in the secondary winding 33 which is leading or lagging with respect to the energisation of the winding $23ab$ according to the sense of the error.

Instead of converting the actuator $SYN_1$ to a two-phase motor as described it may be retained as a three-phase motor with two stator windings, the winding which is connected to the alternator lines $La$, $Lb$ and $Lc$ during synchronising being disconnected therefrom on closing of the tie-breaker switch $TB_1$ and being connected instead to a source of three phase current at a controlled frequency, for example an alternator driven by a constant speed electric motor as described in the specification accompanying British Patent No. 743,669, filed March 11, 1953, accepted November 11, 1955, and sealed and granted May 8, 1956.

Figure 5 shows how the synchronizing actuators can be used for load sharing control after their associated alternators have been paralleled. In this case the stator winding 21 is again short circuited as in the arrangement described with reference to Figure 4 and the stator winding 23 is again converted by a switch 40 into the equivalent of a two-phase winding one phase of which, comprising the windings $a$ and $b$, remains connected across the alternator output lines $La$ and $Lb$, but the other phase winding $c$ is connected in parallel with the secondaries of the load sharing current transformers $CTa$ and $CTb$.

We claim:

1. A polyphase alternating current system comprising a plurality of alternators driven by separate prime movers and arranged for connection in parallel to a common utilisation network, in which the prime mover of each alternator is provided with power-control means and operating means therefor responsive to the ratio of the electrical load on the said alternator to the electrical load on another of the alternators, the system being arranged in the manner of a closed chain so that, when all the alternators are connected in parallel to the network, the load on a first alternator is controlled to maintain said load in a desired ratio with the load on a second alternator, the load on the second alternator is controlled to maintain said load in a desired ratio with the load on a next alternator, and so on, the load on the last alternator in the system so controlled being controlled to maintain said load in a desired ratio with the load on the first alternator.

2. A polyphase alternating current system as claimed in claim 1, in which the operating means for each power-control means comprises a two-phase induction motor one phase winding of which is energized in proportion to the line voltage and the other phase-winding of which is connected across the secondary of a current transformer in one of the phase lines of the output of the associated alternator, and, in opposition to the energisation thereby produced, across the secondary of a current transformer in the corresponding phase line of the output of the next alternator in the chain.

3. A polyphase alternating current system as claimed in claim 1, in which there are provided two current transformers in corresponding phase lines of all the alternators, the two secondaries thereof forming respectively part of the load control system of the alternator the phase line of which they are in and part of the load control system of the alternator preceding, in the chain, the alternator the phase line of which they are in.

4. A polyphase alternating current system as claimed in claim 2, comprising two current transformers in corresponding phase lines of all the alternators, the two secondaries thereof forming respectively part of the load control system of the alternator the phase line of which they are in and part of the load control system of the alternator preceding in the chain, the alternator the phase line of which they are in, and means for connecting the said other phase winding of the two-phase induction motor also in parallel with the secondaries of the current transformers forming part of the load control system of the next alternator in the chain when said next alternator is isolated from the network, whereby the load on the first alternator is controlled to maintain said load in a desired ratio with the next un-isolated alternator instead of with the said isolated nex alternator.

5. A polyphase alternating current system as claimed in claim 4, in which the two current transformers in the phase line of each one alternator have substantially equal transformation ratios so that when they are brought into opposition with one another by the isolation of the associated alternator, their effect in the load control system linking the preceding and following alternators is nil.

6. A polyphase alternating current system as claimed in claim 1, in which the operating means for each power-control means comprises a two-phase induction motor one phase-winding of which is energized in proportion to the line voltage and the other phase-winding of which is connected in series with two resistances across one of which a potential drop is produced in one sense proportional to the current in one of the phase lines of the output of the associated alternator and across the other of which a potential drop is produced in the opposite sense proportional to the current in the corresponding phase line of the output of the next alternator in the chain.

7. A polyphase alternating current system as claimed in claim 1, in which the power control means for each prime mover is operated in response to load-sharing correction signals through a variable-datum governor having a drooping load-speed characteristic.

8. A polyphase alternating current system as claimed in claim 1 in which the same or different power control means for each prime mover are operated by a substantially isochronous frequency governing system.

9. A polyphase alternating current system as claimed in claim 1, wherein there is associated with an alternator, its prime mover and power control means therefor, a dynamo-electric actuator for adjusting the power control means in response to differences of frequency between the alternator and the network during speed adjustment of the alternator for paralleling, and wherein there is provided switch means for changing over the actuator, when the alternator has been paralleled to operate the power control means in response to change of frequency of the network relatively to a datum.

10. A polyphase alternating current system as claimed in claim 1 wherein there is associated with an alternator, its prime mover and power control means therefor, a dynamoelectric actuator for adjusting the power control means in response to differences of frequency between the alternator and the network during speed adjustment of the alternator for paralleling, and wherein there is provided switch means for changing over the actuator, when the alternator has been paralleled, to operate the power control means in response to changes in the ratio of the load on the associated alternator to the load on one or more of the other alternators.

11. A polyphase alternating current system as claimed in claim 2, wherein the two-phase motor associated with one at least of the alternators also constitutes a dynamoelectric actuator for adjusting the power control means of the atlernator in resonse to differences of frequency between the alternator and the network during speed adjustment of the alternator for paralleling, switch means being provided for changing over the two-phase motor from frequency control of the alternator to load control of the alternator and vice versa.

References Cited in the file of this patent

UNITED STATES PATENTS

| | | |
|---|---|---|
| Re. 20,548 | Doyle | Nov. 9, 1937 |
| 2,501,340 | Kresser | Mar. 21, 1950 |
| 2,504,768 | Watson et al. | Apr. 18, 1950 |
| 2,710,355 | Chilman et al. | June 7, 1955 |

FOREIGN PATENTS

| | | |
|---|---|---|
| 516,613 | Great Britain | Jan. 5, 1940 |
| 653,994 | Great Britain | May 30, 1951 |
| 732,052 | Great Britain | June 15, 1955 |
| 743,669 | Great Britain | Nov. 11, 1955 |